United States Patent [19]

Yarnold

[11] 4,397,068
[45] Aug. 9, 1983

[54] APPARATUS AND METHOD FOR SECURING TUBE SUPPORTS IN A COIL BUNDLE

[75] Inventor: Daniel J. Yarnold, Memphis, Tenn.

[73] Assignee: Carrier Corporation, Syracuse, N.Y.

[21] Appl. No.: 247,688

[22] Filed: Mar. 26, 1981

[51] Int. Cl.³ .............................................. B23P 15/26
[52] U.S. Cl. ...................................... 29/157.4; 29/726; 29/157.3 C; 29/157.3 A
[58] Field of Search ...................... 29/157.4, 726, 727, 29/157.3 R, 157.3 C, 157.3 A, 157.3 B, 157.3 AH

[56] References Cited

U.S. PATENT DOCUMENTS

| | | | |
|---|---|---|---|
| 3,005,253 | 10/1961 | Venables | 29/33 G |
| 3,134,166 | 5/1964 | Venables | 29/157.3 AH |
| 4,077,116 | 3/1978 | Cunningham et al. | 29/727 |
| 4,085,488 | 4/1978 | Hanert et al. | 29/33 G |
| 4,139,932 | 2/1979 | Hanert et al. | 29/157.3 R |

Primary Examiner—Francis S. Husar
Assistant Examiner—V. K. Rising
Attorney, Agent, or Firm—Donald F. Daley; Robert P. Hayter

[57] ABSTRACT

Apparatus and a method for inserting tube supports into a loose coil bundle are disclosed. A tube support insertion machine is disclosed wherein a series of spaced support arms are located within a cylindrical coil bundle. A drive is provided for forcing the support arms outwardly, each support arm having a tube support mounted thereto such that the tube supports are forced through the coil bundle securing each of the loops of the bundle in the appropriate location. A tube support for securing the coil bundle prior to the tube sheet insertion and a drive for co-ordinately driving the various support arms with equal force are further disclosed.

12 Claims, 6 Drawing Figures

APPARATUS AND METHOD FOR SECURING TUBE SUPPORTS IN A COIL BUNDLE

BACKGROUND OF THE INVENTION

1. Field of the Invention

The present invention concerns securing tube sheets to a loose heat exchanger tube bundle. More particularly, the herein described invention refers to a method and apparatus for forcing tube supports into rows of tubing to maintain tubing spacing and form an integral heat exchanger.

2. Prior Art

One effective type of heat transfer surface for use in transferring heat energy between refrigerant and air flowing thereover is a tube having fins wrapped about the exterior thereof to form a finned heat exchanger surface. As part of the manufacture of such wrapped fin tube, a long tube is either rotated to have the fins wrapped thereabout or the fin material is rotated about the tube. In either event, a fairly lengthly linearly extending tube emerges having the fin wrapped about the exterior surface of the tube. It is then incumbent upon the manufacturer of the heat exchange equipment to form this tube into a heat exchange configuration suitable for incorporation into a heat exchange unit. One manner of forming this tube into such an arrangement is to wrap the tube about a drum. The drum may be of a selected configuration depending upon the configuration desired for use in the heat exchange unit. As is known in the art, this configuration is generally selected to conform to a desired unit enclosure structure.

Once this heat exchanger is selected, the lengthy tube may be wrapped about the heat exchanger forming drum to the appropriate configuration. The tube in this configuration is then removed from the drum and remains generally in the drum configuration although the successive loops of the heat exchange tube are not secured relative to each other.

A tube support may be used to secure the successive loops of tubing into the desired end configuration. A tube support suitable for this application might have a tube securing portion to maintain each loop of the bundle in the appropriate location. Additionally, this tube support might have means for securing the tubes between the securing portion of the support and another member. For a particular tube support see related U.S. application, Ser. No. 202,984.

The present invention concerns both apparatus and a method for securing with tube sheets and loops of the wrapped fin coil bundle which may move relative to each other. The apparatus includes support means such that the coil bundle may be mounted thereon. A series of spaced support arms, each adapted to hold a tube sheet, is mounted within the coil bundle. A drive means is provided for outwardly displacing the support arms in such a manner that the tube sheets are forced into the coil bundle with the individual loops of the coil being maintained separately within each tube securing portion. The drive means includes an arrangement wherein equal force is applied to each support arm and to help maintain the configuration of the heat exchanger.

SUMMARY OF THE INVENTION

It is an object of the present invention to supply apparatus for inserting tube supports into a coil bundle.

It is another object of the present invention to provide a machine for securing tubes of a coil bundle into a desired end configuration.

It is a further object of the present invention to provide a machine which is reliable, durable, simple to operate and which may rapidly effect the insertion of tube supports to a coil bundle.

It is a further object of the present invention to insert tube supports into a cylindrical coil bundle while maintaining the heat exchanger configuration.

Other objects will be apparent from the description to follow and the appended claims.

The above objects are achieved according to the preferred embodiment of the invention by forming a secured heat exchanger from a coil bundle of unsecured loops utilizing a tube sheet. The apparatus includes a base defining a plurality of slots, each slot extending radially outward from the center of the base. Mounting arms including spacer pads extend from the base such that the coil bundle may be placed on the mounting arms with the spacer pads acting to maintain the coil bundle a predetermined distance from the base. Carriages are mounted for reciprocating movement in the slots. A support arm extends from each carriage and is located interior of the cylinder defined by the coil bundle as the coil bundle is mounted to the machine. Each support arm includes means to secure a tube sheet thereto. A drive means is provided, including a drive plate and linkage arms connecting the drive plate to each carriage. The drive plate is reciprocated by a pneumatic cylinder or like device to displace all the carriages simultaneously in an outward direction such that the tube sheets mounted on the support arms are forced into the heat exchange bundle with equal force. Once the tube sheets are inserted into the bundle the bundle is maintained in the desired configuration. The tube sheets are designed to include means for securing the coil loops therein.

DETAILED DESCRIPTION OF THE PREFERRED EMBODIMENT

The preferred embodiment as described herein will refer to a tube sheet insertion machine and method for use in inserting a particular tube sheet into a coil of wound fin heat exchange tubing. It is to be understood that this invention applies to tubing other than wound fin heat exchange tubing, applies to machines having different tube support for use therewith and is not limited to machines including the orientation, number of slots, number of support arms or number of mounting means as disclosed herein.

It is also to be understood that a particular drive means will be described herein but that other equivalents will accomplish the same result.

Figure 1:
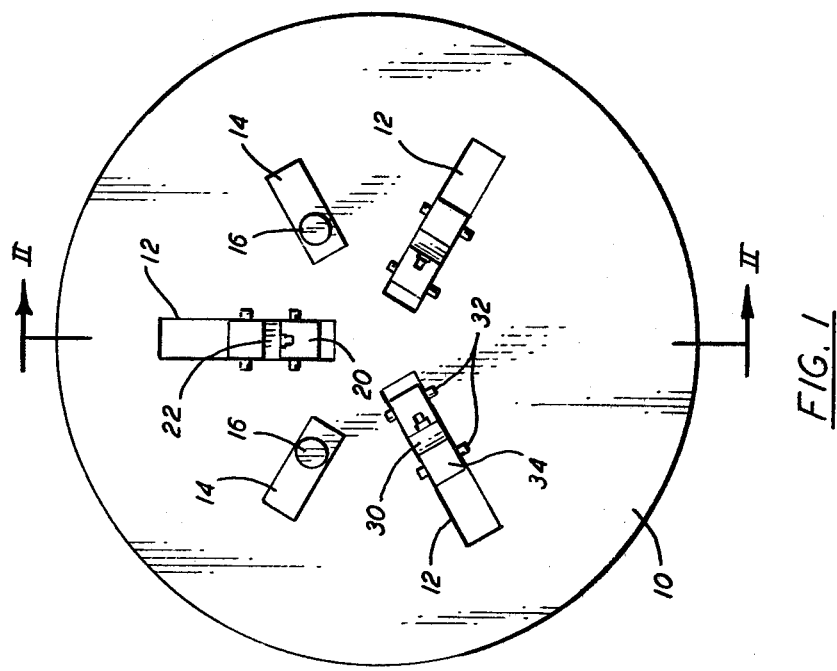
FIG. 1 is a front view of the tube support insertion machine.

Referring now to FIG. 1, a front view of the tube support insertion machine, it can be seen that back plate or base 10 has components mounted thereto. Mounting bars 16 and spacer pads 14 are provided at two locations near the top of the back plate 10. Back plate 10 additionally defines three slots 12 equally spaced and positioned to extend radially from a point in the center within each slot 12 is mounted carriage 30 having sliding pins 32 extending therefrom. The sliding pins extend sufficiently far from the carriage body to engage the top surface of back plate 10. Support arms 20 are mounted to each carriage and extend outwardly therefrom. Each support arm has a tube sheet notch 22 to which a tube sheet may be mounted. The tube sheet may be engaged in the tube sheet notch via an interference fit or additional means such as snap clips or springs may be utilized to hold the tube sheet within the notch during assembly.

Figure 2:
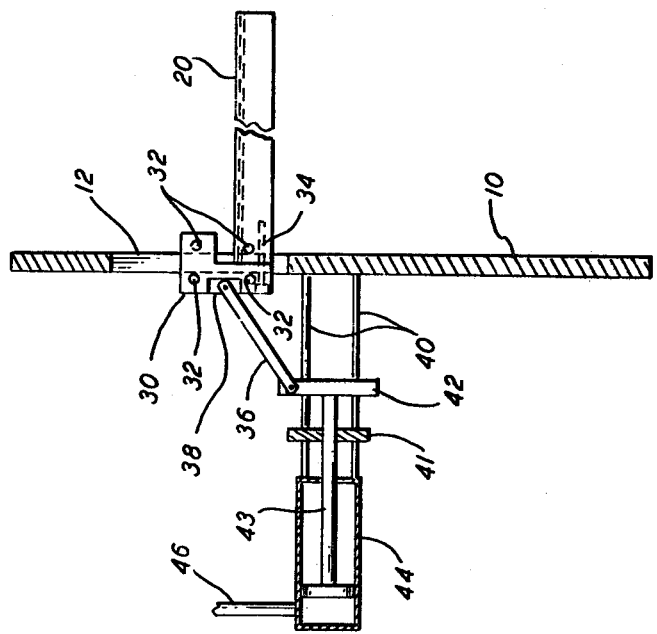
FIG. 2 is a sectional view of a portion of the tube support insertion machine taken along line II—II of FIG. 1.

Referring now to FIG. 2, a sectional view of FIG. 1 taken along line II—II, it can be seen that carriage 30 extends both above and below back plate 10. Sliding pins 32 are mounted to engage both sides of back plate 10 such that carriage 30 is maintained in sliding engagement with slot 12. Support arm 20 is shown extending from carriage 30 and is secured thereto by bolt 34.

It can be additionally seen that pneumatic cylinder 44, including drive rod 43, is connected to drive plate 42. Drive plate 42 is mounted to reciprocate on guide bars 40 such that as the air source 46 supplies pressurized air to the pneumatic cylinder drive plate 42 is moved toward or away from the back plate 10. Guide bar plate 44 acts to secure the ends of guide bars in position. Arm 36 is secured to drive plate 42 with a pin and to carriage 30 at arm slot 38 with another pin. Hence, as the drive plate 42 reciprocates inwardly and outwardly the carriage 30 reciprocates radially within slot 12.

Figure 3:
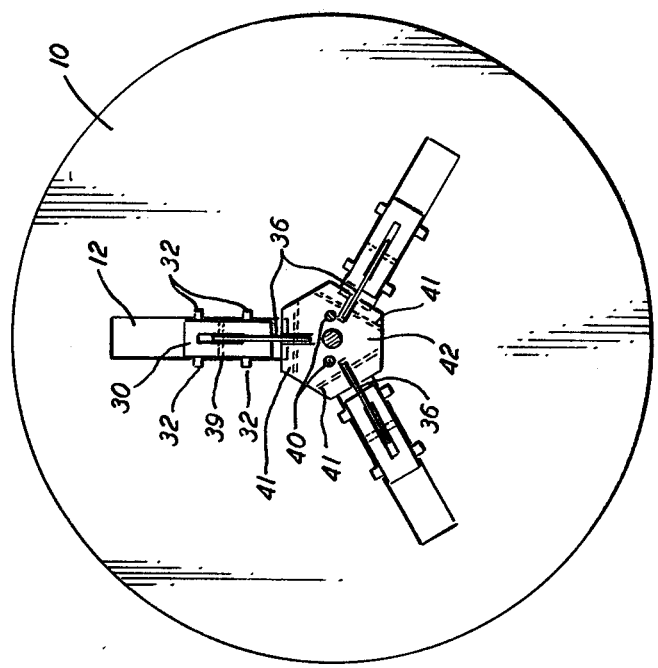
FIG. 3 is a back view of the tube insertion machine.

It may be seen in FIG. 3 that all three carriages are connected each by its own arm 36 to the drive plate. As the drive plate reciprocates, each carriage is moved in conjunction with the others radially along slots 12. Pins 39 secure each arm 36 to carriages 30. Pins 41 secure the other end of each arm 36 to drive plate 42.

Figure 4:
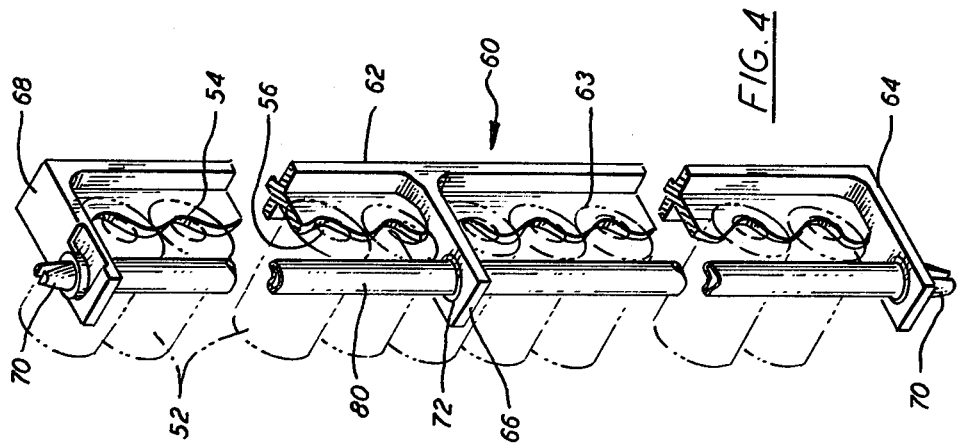
FIG. 4 is an isometric, partially cutaway view of a tube support as could be used with this machine.

FIG. 4 discloses a particular tube sheet arrangement. Other tube sheet configurations will suitably serve for purposes of the present application. This tube support 60 includes a back portion 62 and securing portion 63 having openings defined thereby for the receipt of the individual loops of the coil bundle. Tube support 60 also has end extension portions 64 and 68 and center extension portion 66 each defining an opening 72 into which tube 80 may be inserted. Pins 70 secure tube 80 within the openings of the extension portions and the various loops of the heat exchanger are then secured between the securing portion 63 of the tube support and tube 80. Loops of the coil bundle are designated 52, each loop having a tube portion 56 and a fin portion 54 wrapped thereabout. With a tube support as shown in FIG. 4 mounted to a support arm, the tube support would be forced sufficiently outward that each loop of the heat exchanger would be seated in the appropriate securing portion and such that the extension portions project sufficiently through the bundle that tube 80 may be inserted through the openings of the extension portions to maintain the tubes between tube 80 and the securing portions.

Figure 5:
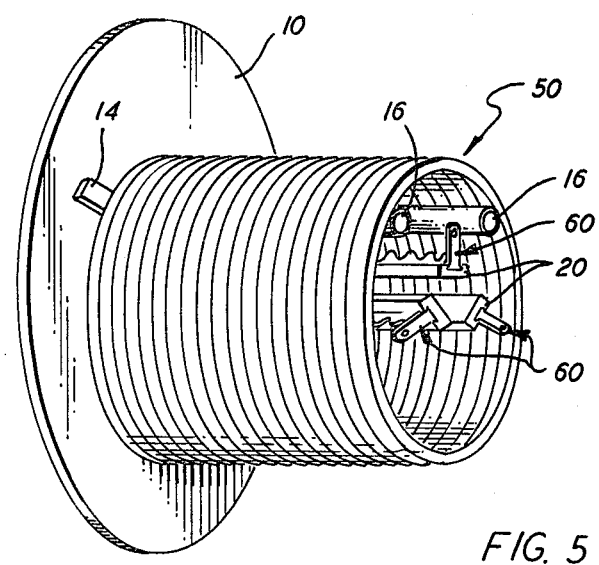
FIG. 5 is an isometric view of the tube support insertion machine with a loose coil bundle mounted thereto and the support arms ready to insert the tube sheets into the coil bundle.
Figure 6:
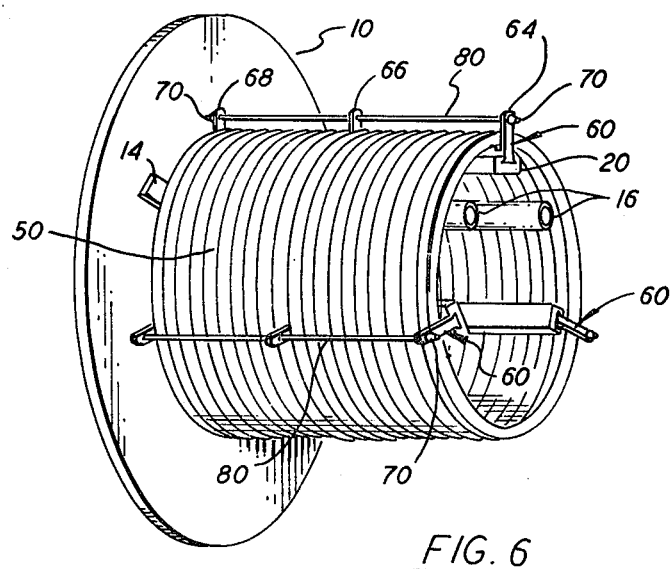
FIG. 6 is an isometric view as is FIG. 5 showing the support arms in the appropriate position where the tube sheets have been forced into the coil bundle securing same.

FIG. 5 is an isometric view of the tube support insertion machine having the coil bundle resting on mounting bars 16. It can be seen that as the coil bundle rests on mounting bars 16 spacer pads 14 extend thereunder such that a space is maintained between the back plate 10 and bundle 50. As seen in FIG. 5, the loops of the coil bundle are draped over mounting bars 16 defining a coil bundle cylinder having the three support arms all located interior of this cylinder. Located on each support arm 20 is a tube support 60 extending in an outward direction. FIG. 6 is similar to FIG. 5 however the drive means has moved the carriages outwardly within the slots such that the support arms have driven the tube supports through the coil bundle. It can be seen that support arms 20 have moved outwardly to the coil bundle and tube sheets 60 engage the individual loops of coil bundle 50. The tube sheet extension portions extend through the coil bundle such that tube 80 may be inserted through end extension portions 64 and 68 and center extension portion 66. Pins 70 are then mounted to the ends of tube 80 and the various loops of coil bundle 50 are secured. The number of support arms depend upon the number of tube supports desired for the particular application. As shown in FIG. 6, three support arms are used to insert three tube supports through the coil bundle. It will also be noted in FIG. 6 that although the coil bundle is supported by mounting bars 16 when first placed onto the tube sheet insertion machine as the tube supports are inserted the support arms act to raise the bundle off the mounting bars such that equal displacement of each carriage and attached support arm acts to balance the forces applied for inserting the tube sheets. This self-centering arrangement allows for the configuration of the bundle to be maintained and prevents undue stress at any one location.

OPERATION

The coil bundle is removed from a coil forming machine and placed on mounting bars 16 of the tube support insertion machine. The bundle is slid along mounting bars 16 until it stops abutting spacer pads 14 maintaining the bundle a set distance from back plate 10. The carriages with the attached support arms 20 are in the position shown in FIG. 5 when the coil bundle is mounted. Tube supports 60 are mounted within support arm notches 22 prior to the coil bundle being inserted over mounting bars 16.

Once the coil bundle is in place and the support arms have been located with the tube supports the pneumatic cylinder is then energized. As the air pressure builds in the cylinder the drive plate 42 is forced toward the back plate 10. This inward motion causes arms 36 to force carriages 30 radially outwardly from the center of back plate 10. As the carriages are displaced outwardly, the support arms attached thereto are additionally displaced outwardly. The pneumatic cylinder continues to move the drive plate until a predetermined amount of motion has been achieved. This predetermined stop point is when the tube supports have been inserted through the coil bundle such that the two end extension portions and the center extension portion extend therethrough and such that the individual loops of tubing are secured within the securing portion. This stop point is also that point at which the support arms are sufficiently displaced that the coil bundle is in the configuration desired for application in a heat exchange unit. The support arms are maintained in this position while tubes 80 are inserted through the openings in the three extension portions of the tube support. Pins 70 are then used to secure the tubes 80. The loops of the coil bundle are now firmly secured by the tube sheets in the desired heat exchanger configuration. The pneumatic cylinder is then reversed moving the drive plate away from the back plate and sliding the carriages with attached support arms toward the center of back plate 10 away from the coil bundle. The coil bundle including the attached heat exchange supports is now removed from the machine, a new set of tube supports is mounted to the support arms and the machine is ready for the next coil bundle.

Spacers 14 act to maintain a distance between back plate 10 and the coil bundle. The end insertion portion 68 of the tube support is inserted through this space. End insertion portion 64 of the tube support is inserted beyond the opposite end of the heat exchange bundle and extension portion 66 is self-centering between adjacent loops of the bundle. The design of the tube support allows the remaining loops to be individually directed to the appropriate securing portion of the tube support.

The apparatus as described herein incorporates three support arms moving in a radial direction to form a cylindrical heat exchanger. Other configurations of a heat exchanger and other numbers of support arms may be used within the spirit and scope of this invention. Additionally, the type of heat exchange surface and the specific configuration of the tube support may be modified.

The drive means as set forth herein includes a drive plate connected through a mechanical linkage to each carriage to effect an equal movement of each. This equal movement of the three support arms acts to lift the coil bundle off the mounting bars such that the coil bundle is then self-centered between the three support arms and an equal force is applied as each tube sheet is inserted in its own location. Other methods of accomplishing this same result might include using a pneumatic cylinder for each carriage and a common power source. Other drive methods might also suitably serve the purpose as set forth herein.

It is to be understood by those skilled in the art that variations and modifications can be made within the spirit and scope of the herein invention.

What is claimed is:

1. Apparatus for forming a secured heat exchanger from a coil bundle of unsecured loops and a tube sheet having loop securing portions which comprises:
    a base defining at least one elongated slot;
    mounting means extending from the base adapted to receive the coil bundle and located to maintain the coil bundle in a position wherein the slot defined by the base is within a cylinder defined by the coil bundle;
    a carriage including guide means mounted for reciprocating movement within the slot;
    a support arm fastened to extend from the carriage, said support arm including means for attaching the tube sheet thereto; and
    motive means for displacing the carriage and the attached support arm from a first position where the tube sheet may be attached to the support arm to a second position where the tube sheet engages the coil bundle securing the coil loops in the desired position.

2. The apparatus as set forth in claim 1 wherein the mounting means includes two spaced bars extending from the base upon which the coil undle may be rested.

3. The apparatus as set forth in claim 1 wherein the base defines a plurality of slots each spaced equally from the others and each slot being located approximately on a radius of a cylinder defined by the coil bundle and further comprising a plurality of carriages, one carriage mounted within each slot and a plurality of support arms, one support arm extending from each carriage.

4. The apparatus as set forth in claim 3 wherein all of the support arms are located within the cylinder defined by the coil bundle and wherein the motive means further comprises means for simultaneously displacing each of the carriages with the attached support arms.

5. The apparatus as set forth in claim 3 wherein the motive means includes means for applying equal force to each carriage enabling each tube sheet to be inserted into the coil bundle with equal force.

6. The apparatus as set forth in claim 5 wherein the motive means further comprises:
    a drive linkage including a drive plate mounted on drive bars connected to the base for reciprocating motion of said drive plate and a linkage arm connecting the drive plate to each carriage whereby a displacement of the drive plate along the guide bars results in displacement of each carriage along the slot within which it is mounted.

7. The apparatus as set forth in claim 1 wherein the mounting means further comprises a spacer pad mounted to the base such that when the coil bundle is mounted to the mounting means the spacer pad maintains the bundle a distance from the base.

8. The apparatus as set forth in claim 1 wherein the carriage further comprises a generally rectangular body mounted within the slot, a first set of sliding pins extending outwardly from the body to engage a surface of the base and a second set of sliding pins extending outwardly from the body to engage the opposite surface of the base whereby the combination of pin sets maintain the carriage in sliding engagement within the slot.

9. The apparatus as set forth in claim 3 wherein the base defines three slots equally spaced from each other and each located on a radius extending generally from the axis of a cylinder defined by the coil bundle.

10. A method of securing a cylindrical bundle of heat exchange tubing including a plurality of loops of tubing by mounting the loops within a tube support having securing portions for guiding each loop, extension portions and a tube secured within openings in the extension portions to affix the loops of tubing between the tube and the securing portions of the tube support, which comprises the steps of:
    placing the bundle of tubing on a support means;
    locating a plurality of tube supports within the interior of the coil bundle;
    forcing the tube supports outwardly simultaneously such that each loop is secured within a securing portion of the tube supports and a final heat exchanger configuration is achieved; and
    inserting the tubes through the openings in the extension portions of the tube supports to secure the loops of the coil bundle.

11. The method as set forth in claim 10 wherein the step of locating comprises securing each tube support to a support arm mounted for sliding motion relative to the coil bundle, said support arms being equally spaced within the cylinder defined by the coil bundle.

12. The method as set forth in claim 11 wherein the step of forcing comprises connecting each of the support arms to a drive plate through a mechanical linkage and translating the drive plate to displace the support arms with attached tube supports outwardly into the coil bundle.

* * * * *